(12) United States Patent
Korn

(10) Patent No.: US 6,813,420 B1
(45) Date of Patent: Nov. 2, 2004

(54) PROCESS AND SYSTEM FOR TUNABLE FILTER OPTICAL TRAIN ALIGNMENT

(75) Inventor: Jeffrey A. Korn, Lexington, MA (US)

(73) Assignee: Axsun Technologies, Inc., Billerica, MA (US)

( * ) Notice: Subject to any disclaimer, the term of this patent is extended or adjusted under 35 U.S.C. 154(b) by 628 days.

(21) Appl. No.: 09/666,194

(22) Filed: Sep. 21, 2000

(51) Int. Cl.[7] .............................. G02B 6/26; G02B 6/42
(52) U.S. Cl. ........................................... 385/52; 385/33
(58) Field of Search .............................. 385/31, 33, 49, 385/52, 35, 88, 90, 93; 398/85, 88, 129, 131, 156, 212; 359/169, 170, 179, 193, 195, 210, 520, 528, 578, 580, 590, 889

(56) References Cited

U.S. PATENT DOCUMENTS

| | | | | |
|---|---|---|---|---|
| 5,002,348 A | * | 3/1991 | Wolf | 359/107 |
| 5,212,746 A | | 5/1993 | Miller et al. | |
| 5,926,594 A | | 7/1999 | Song et al. | |
| 6,049,412 A | * | 4/2000 | Bergmann et al. | 359/301 |
| 6,141,361 A | * | 10/2000 | Mears et al. | 372/20 |
| 6,370,299 B1 | * | 4/2002 | Green et al. | 385/33 |
| 6,426,830 B1 | * | 7/2002 | Robinson | 359/308 |
| 6,498,668 B1 | * | 12/2002 | Korevaar | 398/129 |
| 6,611,642 B1 | * | 8/2003 | O'Neill et al. | 385/33 |
| 2002/0028049 A1 | * | 3/2002 | Bartur et al. | 385/92 |
| 2002/0037149 A1 | * | 3/2002 | Chen | 385/147 |

FOREIGN PATENT DOCUMENTS

EP      0 545 584 A1      6/1993      ............ G02B/6/42

* cited by examiner

Primary Examiner—Brian Healy
Assistant Examiner—Daniel Petkovsek
(74) Attorney, Agent, or Firm—J. Grant Houston (57) ABSTRACT

An alignment process for a fiber optic system, which includes at least one lens and a tunable filter element, comprises transmitting an optical signal into the system and detecting a back-reflection from the lens and/or the tunable filter element. The position of the lens relative to the tunable filter element is then manipulated in response to the back-reflection. This alignment prevents the excitation of higher order modes.

38 Claims, 7 Drawing Sheets

PROCESS AND SYSTEM FOR TUNABLE FILTER OPTICAL TRAIN ALIGNMENT

BACKGROUND OF THE INVENTION

Tunable micro electromechanical (MEMS) filters are playing an increasingly important role in modern optical communication networks. They are being deployed in applications ranging from systems that monitor the spectral characteristics of the optical signals that are transmitted through the networks to tuning elements for laser devices, for example. These applications are most important in modern wavelength division multiplex (WDM) systems in which many optical carrier signals are combined into a common fiber at different carrier wavelengths. Still further applications include matched-noise filtering at receivers, in add-drop devices, and tunable devices such as tunable lasers.

One common tunable filter configuration uses two nominally parallel mirrors, in which at least one of the mirrors is translated relative to the other mirror to achieve the tuning function. Such tunable filters are often referred to as tunable Fabry-Perot filters. Typically, at least one of the two mirrors is curved to ease assembly tolerances.

Some conventional systems integrate the tunable filter into the larger optical system by simply locating it between two fiber pigtails; one fiber pigtail emits the optical signal to be filtered and the other fiber pigtail collects the filtered optical signal after its transmission through the tunable filter. The tunable filter is oriented to be orthogonal to the axis extending between the fiber endfaces.

SUMMARY OF THE INVENTION

As optical systems are developed that allow for higher levels of functionality in a single package, the alignment of the tunable filter elements in the optical systems becomes less trivial. This is especially true in systems utilizing free-space interconnects between the tunable filters and other optical components in the system.

Improper or imprecise alignment can excite higher order modes in the optical filter train. These higher order modes are undesirable because they can cause confusion as to how many WDM channels exist in an optical signal, for example, in the received signal. It can also cause undesirable inter-channel crosstalk.

In general, according to one aspect, the invention features an alignment process for a fiber optic system including at least one lens and a tunable filter element. The process comprises transmitting an optical signal into the system and detecting a back-reflection from the lens and/or the tunable filter element. The position of the lens relative to the tunable filter element is then manipulated in response to the back-reflection.

In general, according to another aspect, the invention features an alignment process in which an optical signal is transmitted into the system while a camera is in the optical link of the system. The lens is then aligned using its image position on the camera.

In one embodiment, the optical signal is transmitted backwards through the optical system and tuned to a passband of the filter.

In general, according to another aspect, the invention features an alignment process in which an optical signal is transmitted into the system while attaching the fiber pigtail. The endface of the fiber is then positioned to maximize a ratio between a lower order mode and a next higher order mode.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
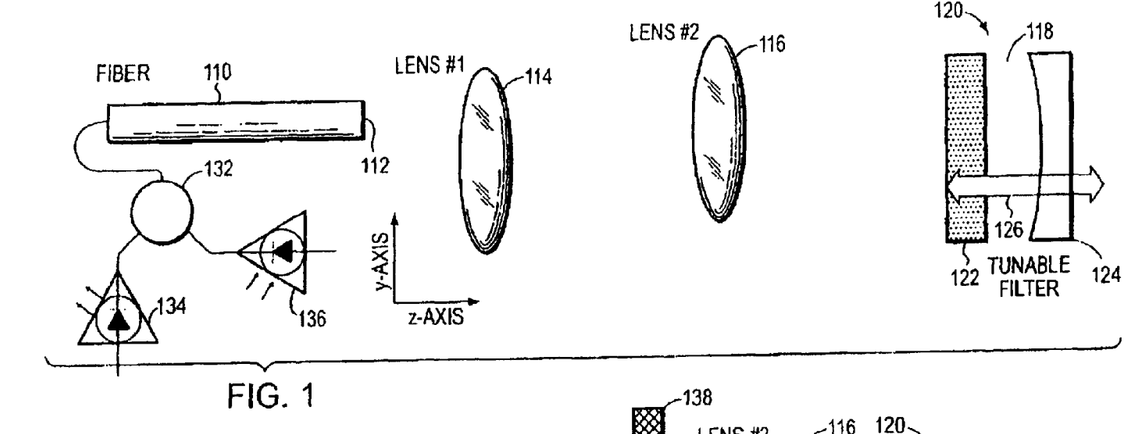
FIG. 1 is a schematic, plan view showing a misaligned optical train for a tunable filter.

FIG. 1 shows an exemplary optical system to which the present invention is applicable.

Specifically, the present invention is most applicable to fiber-optic-based optical systems where the single-transverse mode optical signal is provided to the optical system via a fiber 110. As is common, the optical signal that is emitted from the fiber's endface 112 forms a diverging beam, which is typically collimated or has its collimation improved by a lens, such as a first convex lens 114. The invention is extendable to the more complex system where the optical signal beam is then intended to be focused by a second lens 116 into the cavity 118 of a tunable filter 120.

Figure 9:
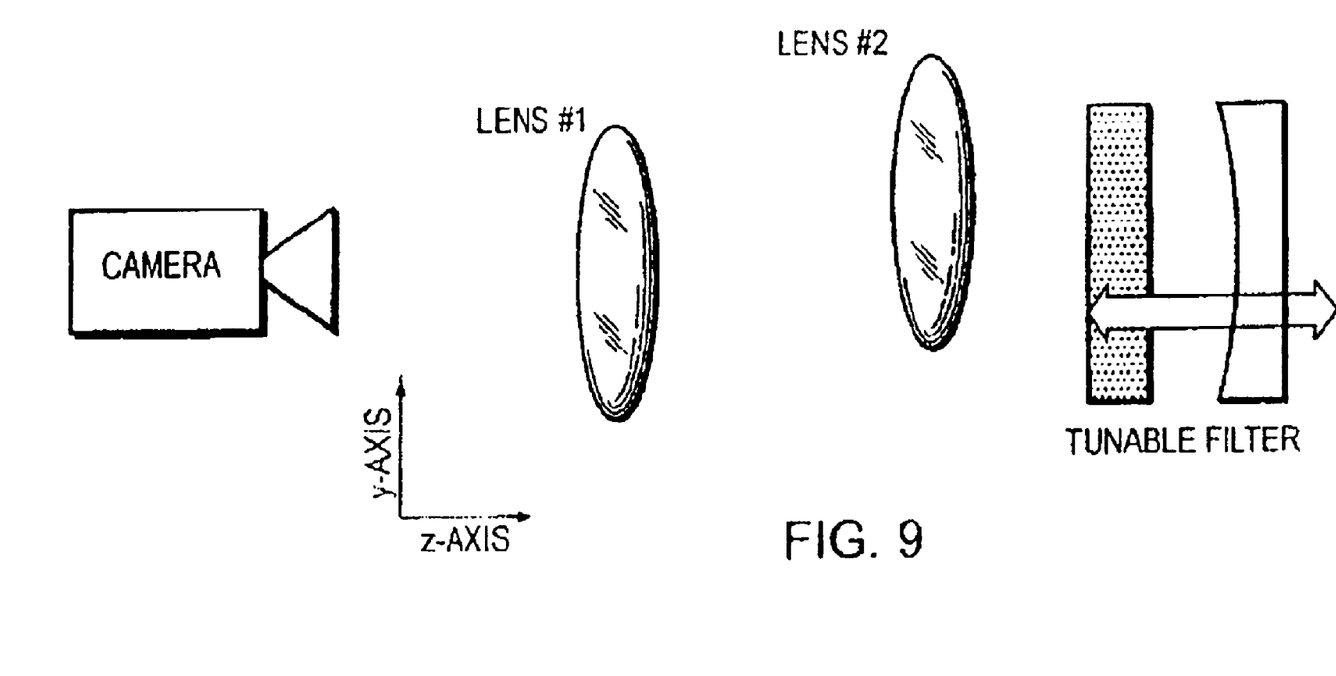
FIG. 9 is a schematic, plan view showing the alignment of the optical train utilizing the second embodiment of the alignment technique of the present invention.

The present invention is applicable to small optical system and beam sizes. Specifically, the single mode fiber has a mode size of approximately 10 microns. The maximum beam size in the trains of FIGS. 1 and 9 is less than 400 microns and propagates between 0.5 and 2.0 millimeters above a bench to which the optical components are attached. In the preferred embodiment, the maximum beam size is less 150 microns or about 100 microns.

In the current implementation, the lenses 114, 116 are constructed according to the mass transport technique described in U.S. Pat. No. 5,618,474, the teachings of which are incorporated herein by this reference in their entirety. The diameter of the lenses is between 100 and 500 microns. Typically the diameters are between 150 and 300 microns. The invention, however, is compatible with other types of microlenses such as those generated by diffractive, binary optics, gradient index processes, or refractive element replication, for example. In the preferred embodiment, the filter is a MEMS device as described in patent application Ser. No. 09/649,168, filed on Aug. 25, 2000, by Flanders, et al., entitled Tunable Fabry-Perot Filter, this application is incorporated herein by this reference.

The illustrated tunable filter 120 comprises a first, typically partially, reflecting mirror 122 and a second, typically partially, reflecting mirror 124. The length of the optical cavity is tunable as illustrated by arrow 126. In the illustrated filter implementation, the second mirror is curved as is common to reduce alignment tolerances relative to other mirrors that define the optical cavity 118.

In the illustrated exemplary optical system shown in FIG. 1, the optical components are misaligned relative to each other. As part of the invention, to achieve alignment, an alignment jig system is connected to the optical system 100. The jig system comprises a circulator or coupler 132 connected to the distal end of the fiber 110. The circulator allows light from an optical signal generator 134, preferably a single frequency signal from a source, such as a distributed-feedback semiconductor laser. The circulator 132 directs back-reflected signals returning from the optical system 100 to a photodetector 136.

Figure 2:
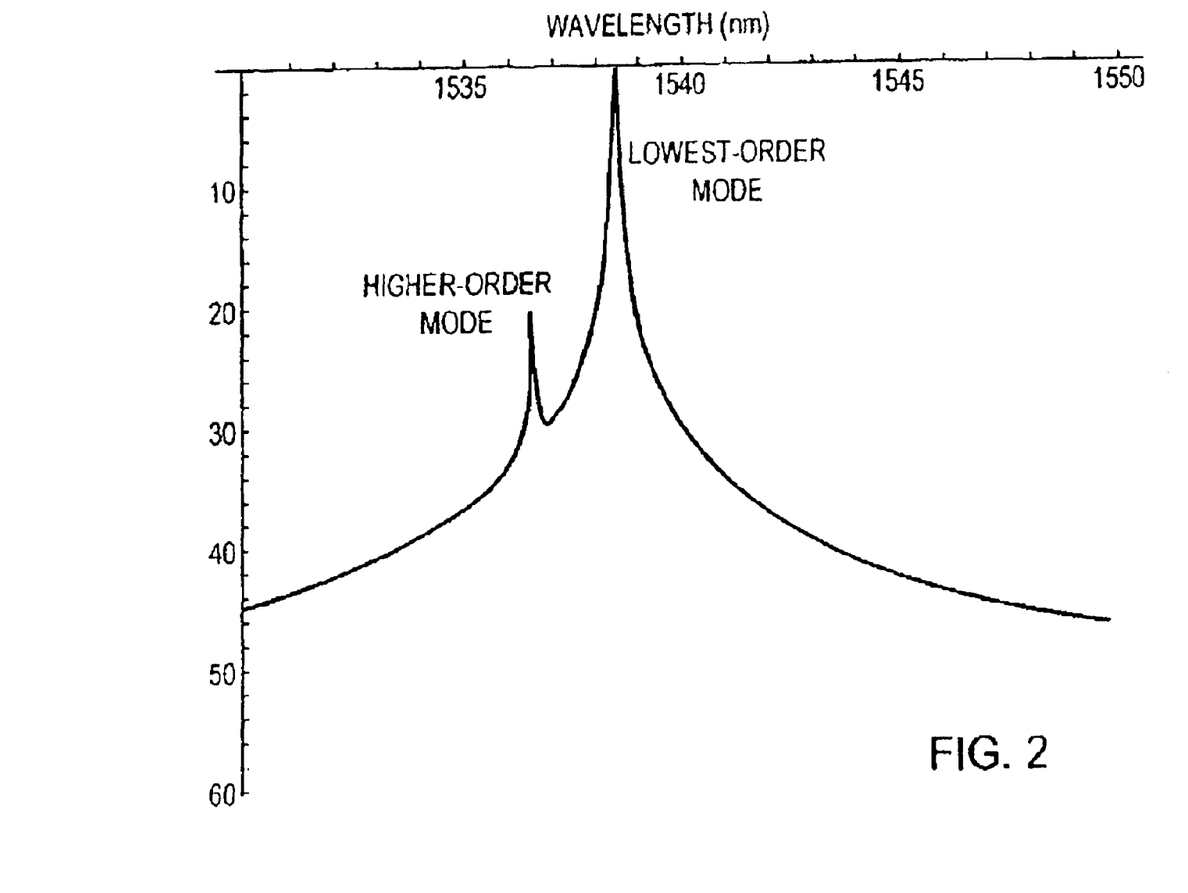
FIG. 2 is a spectral plot illustrating the transfer function for the misaligned optical train including the tunable filter.

FIG. 2 illustrates the transfer function of the optical system illustrated in FIG. 1. Particularly, the schematically illustrated misalignment between the optical components leads to the excitation of higher order modes in the optical system 100. Thus, in addition to the transmission peak of the lowest order mode at approximately 1538 nanometers (nm), a transmission peak of a higher-order mode is also present at approximately 1536 nm. This higher-order mode is undesirable and should be ideally removed from or suppressed in the system.

Figure 3:
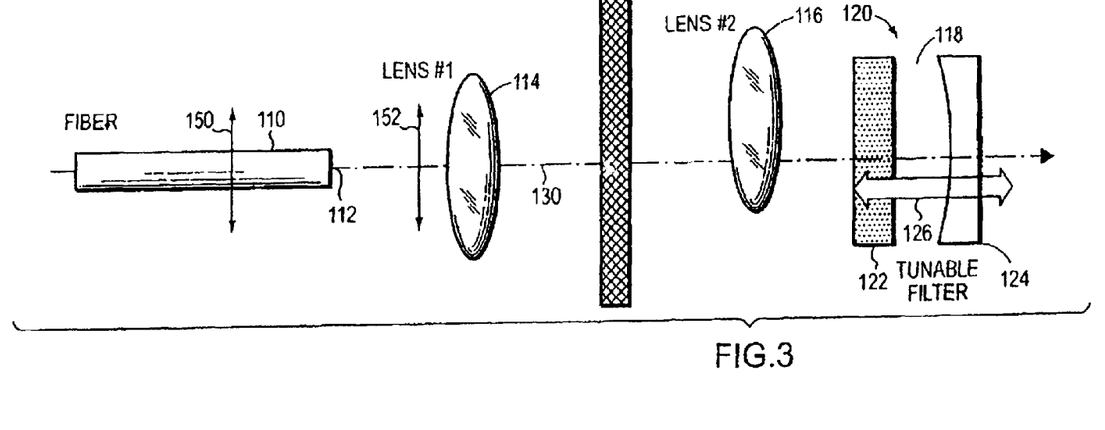
FIG. 3 is a schematic, plan view showing the alignment of part of the optical train utilizing the alignment technique of the present invention.

FIG. 3 illustrates a first step of the alignment process in which a mirror 138 or other reflective element of the alignment jig system is inserted into the optical train of the optical system 100. Specifically, in the illustrated embodiment, the mirror 138 is inserted between lens #1 114 and lens #2 116. The mirror 138 is inserted into the optical train such that it is orthogonal to the nominal optical axis 130.

With the mirror 138 inserted between lens #1 and lens #2, the optical signal generator 134 is activated and the backward coupling efficiency of the optical system 100 with the inserted mirror 138 is detected by detecting the level of optical signal received by the photodetector 136. Note that in this step, the single frequency source, or another broader band source could be used.

In this temporary configuration, the position of the fiber 110 and lens #1 114 are moved relative to each other so that the backward coupling efficiency is maximized by an optical component manipulation system. Specifically, the fiber 110 and lens 114 are moved relative to each other such that the optical signal detected by the photodetector 136 is maximized. Once aligned, these two components define the nominal optical axis for the subsequent alignment process and the aligned system.

In the preferred embodiment, the positions of the fiber and the lens are manipulated in two dimensions in a plane that is orthogonal to the optical axis by the manipulation system. Specifically, their positions are manipulated in the y-axis direction illustrated by arrows 150 and 152, but also in the x-axis direction, which extends into the page in the illustration of FIG. 3.

Figure 4:
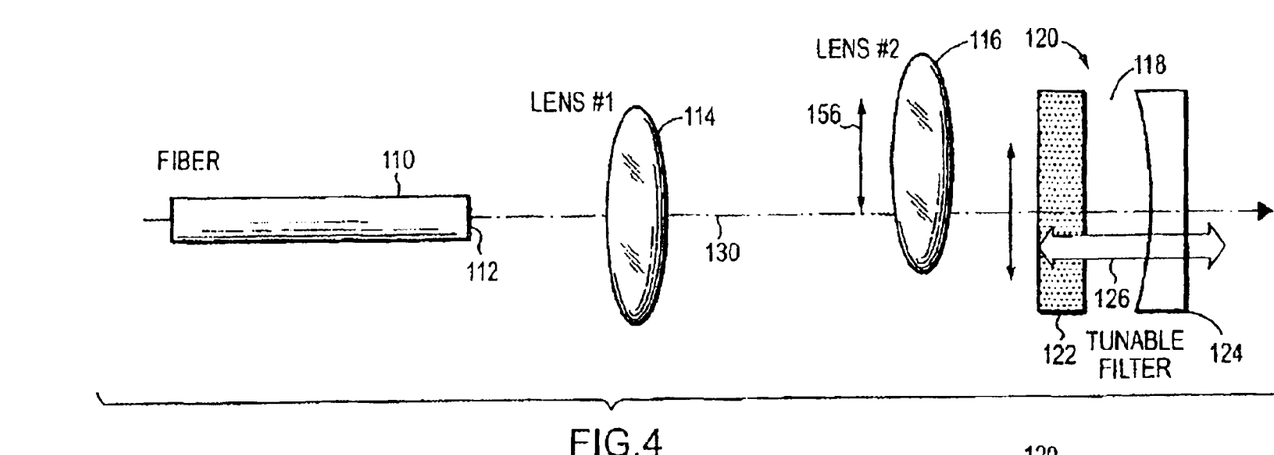
FIG. 4 is a schematic, plan view showing a partially aligned optical train and alignment of the other part of the train utilizing the alignment technique of the present invention.

FIG. 4 illustrates the next step in the alignment process. Specifically, once the alignment of the fiber 10 and lens #1 114 has been achieved within the desired tolerances, the mirror 138 is removed as illustrated in FIG. 4. In this configuration, the optical signal generator 134 is again activated. Its signal is selected relative to the transfer function of the tunable filter 120 such that the wavelength is not within the passband of the tunable filter 120, i.e., the optical signal is off-resonant light relative to the tunable filter 120. The light, however, is within a stop band of the tunable filter 120. Specifically, the light wavelength is confined to at least the tuning wavelength of the tunable filter 120. In this configuration, the optical signal emitted from the fiber 110 into the optical system 100 is reflected by the tunable filter 120. The position of lens #2 is translated in a plane that is orthogonal to the nominal optical axis, i.e., the x, y plane, see arrow 156, by the manipulation system, to again maximize the back-reflection detected by the detector 136.

Figure 5:
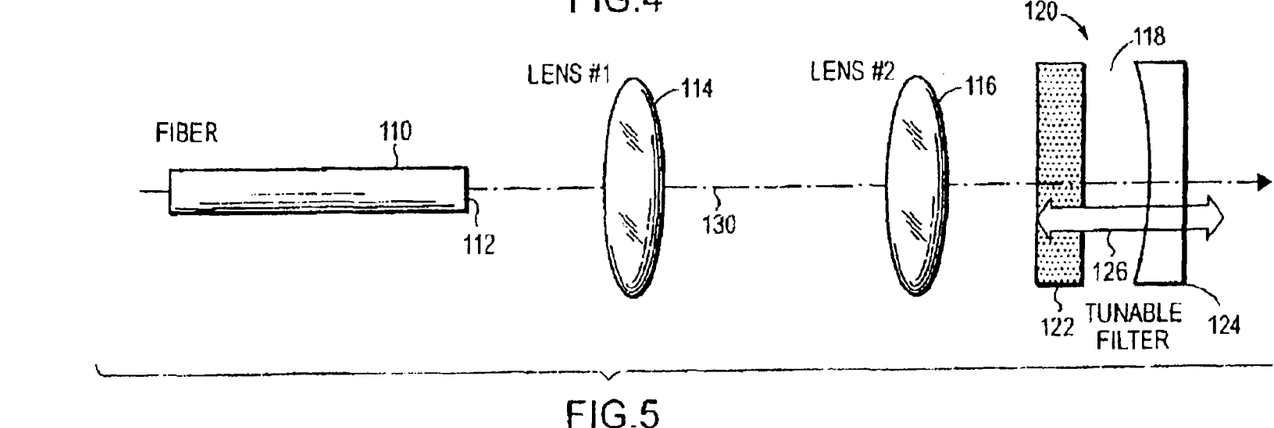
FIG. 5 is a schematic, plan view showing a fully aligned optical train according to the present invention.

FIG. 5 illustrates the aligned optical system 100 after the manipulation of lens #2 116 is performed to maximize the back reflection efficiency of the optical signal 100 at the off-resonant wavelength.

Figure 6:
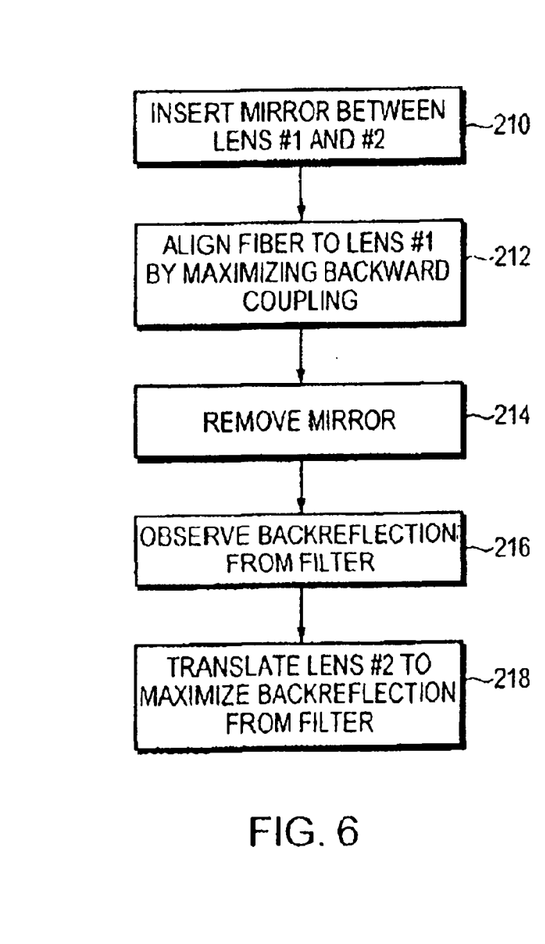
FIG. 6 is a flow diagram summarizing the inventive alignment technique.

FIG. 6 is a flow diagram summarizing the above-described alignment process and optical component manipulation by the manipulation system. Specifically, in step 210, the mirror 138 is inserted into the optical train of the optical system 100 between lens #1 114 and lens #2 116. In step 212, the fiber 110 and lens #1 114 are aligned to maximize backward coupling efficiency. Then, the mirror 138 is removed in step 214. Finally, in steps 216 and 218, lens #2, and also possibly the filter 120, is translated while exciting the system with off-resonant light to again maximize the back-reflection, now from the filter 120.

Figure 7:
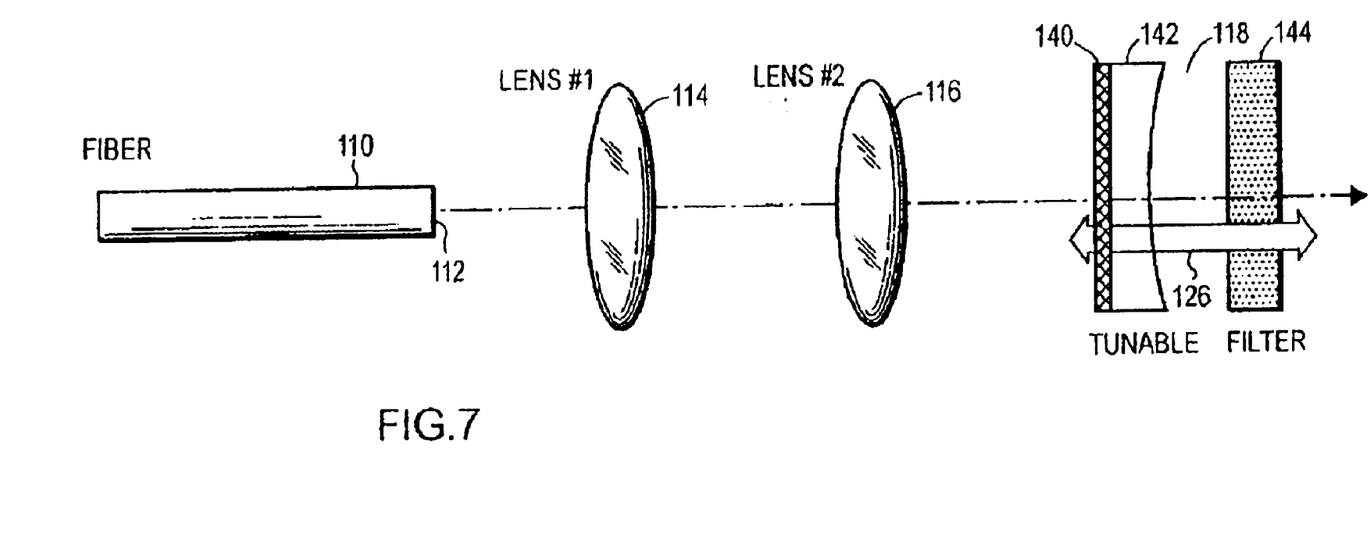
FIG. 7 is a schematic, plan view showing an optical train for a different tunable filter configuration to which the present invention is also applicable.

FIG. 7 illustrates another configuration of an optical system to which the present invention is applicable.

In some tunable filter optical systems, the configuration of the optical filter is essentially reversed from that illustrated in FIG. 1, for example. Specifically, as illustrated in FIG. 7, the optical signal is initially received and transmitted through a curved reflecting element 142, and then reflected off of a flat or curved reflecting element 144 to thereby form the Fabry-Perot filter cavity 118.

In this configuration, an optical coating 140 is added to the tunable filter. It is coated to be reflective at a predetermined wavelength within the transmission spectrum of the fiber tunable filter system 100, or at least lenses 114, 116 and fiber 110. The optical signal generator is then tuned to emit at this predetermined wavelength during the final alignment step of lens #2 116. By tuning to the bandwidth of the narrowband reflective coating 140, a back-reflection is generated to allow the alignment of lens #2 116 by reference to the backward coupling efficiency as described previously in FIG. 4.

Figure 8:
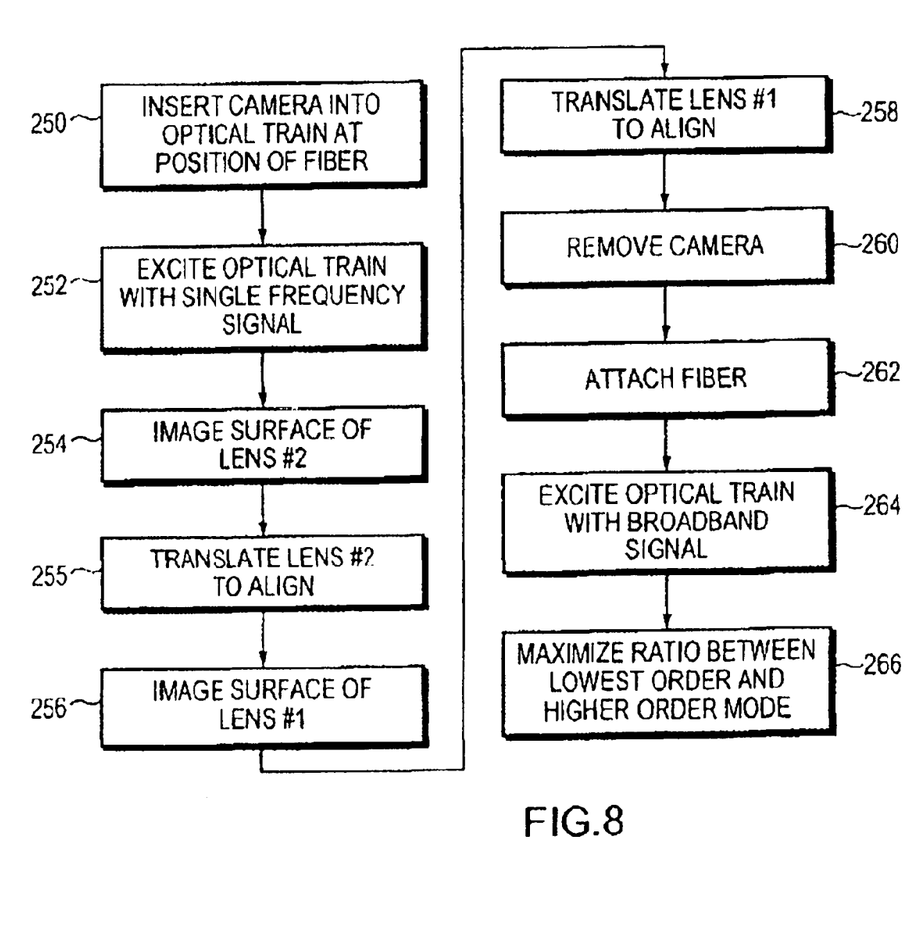
FIG. 8 is a flow diagram illustrating an inventive alignment technique according to another embodiment of the present invention.

FIG. 8 illustrates an alignment process for an optical system as illustrated in FIG. 1 according to another embodiment of the present invention. In this embodiment, a camera, such as a CCD array, is inserted into the train of the optical system 100 at the position of fiber 110. In one implementation, the camera is inserted such that it is axial with the intended position of the fiber's endface 112. Thus, in the typical implementation, the camera is inserted into the optical train of the optical system prior to the installation of the fiber 110. This configuration is illustrated in FIG. 9.

With the camera inserted as described in step 250, the optical train is excited with an optical signal, which is preferably a single frequency such as generated by a distributed feedback laser, for example. This alignment signal is preferably launched in a direction reverse to the direction of optical signal propagation during normal operation of the optical system. The wavelength of the laser and the tunable filter are mutually adjusted so that the laser emission overlaps with the lowest order mode ($TEM_{00}$).

While excited, the surface of lens #2 116 is imaged onto the camera in step 254. Lens #2 116 is then translated with the manipulation system such that the lens image is coincident with the nominal optical axis 130. This translation occurs in a plane that is orthogonal to the nominal optical axis or the x, y plane defined in FIG. 1.

With lens #2 116 aligned, the image of the surface of lens #1 is then imaged onto the camera in step 256. Lens #1 114 is then translated by the manipulation system in the x, y plane in step 258 so that it is similarly coincident and aligned relative to the optical axis 130. Specifically, the center of lens 114 is aligned such that it coincides with the nominal optical axis 130.

In step 260, the camera is removed and the fiber is attached to the optical system in step 262, typically as part of a final manufacturing step of the optical system 100. Then, the optical system is excited with a broadband source in step 264. Specifically, the optical signal generator 130 is selected to be a broadband source such as a super luminescent light emitting diode SLED. With the optical system excited, the ratio between the lowest order mode and any higher order mode is then maximized in step 266. In the typical implementation, the ratio of the lowest order mode in the next higher order mode is maximized in step 266 by positioning the fiber 110 in the x, y plane.

Figure 10:
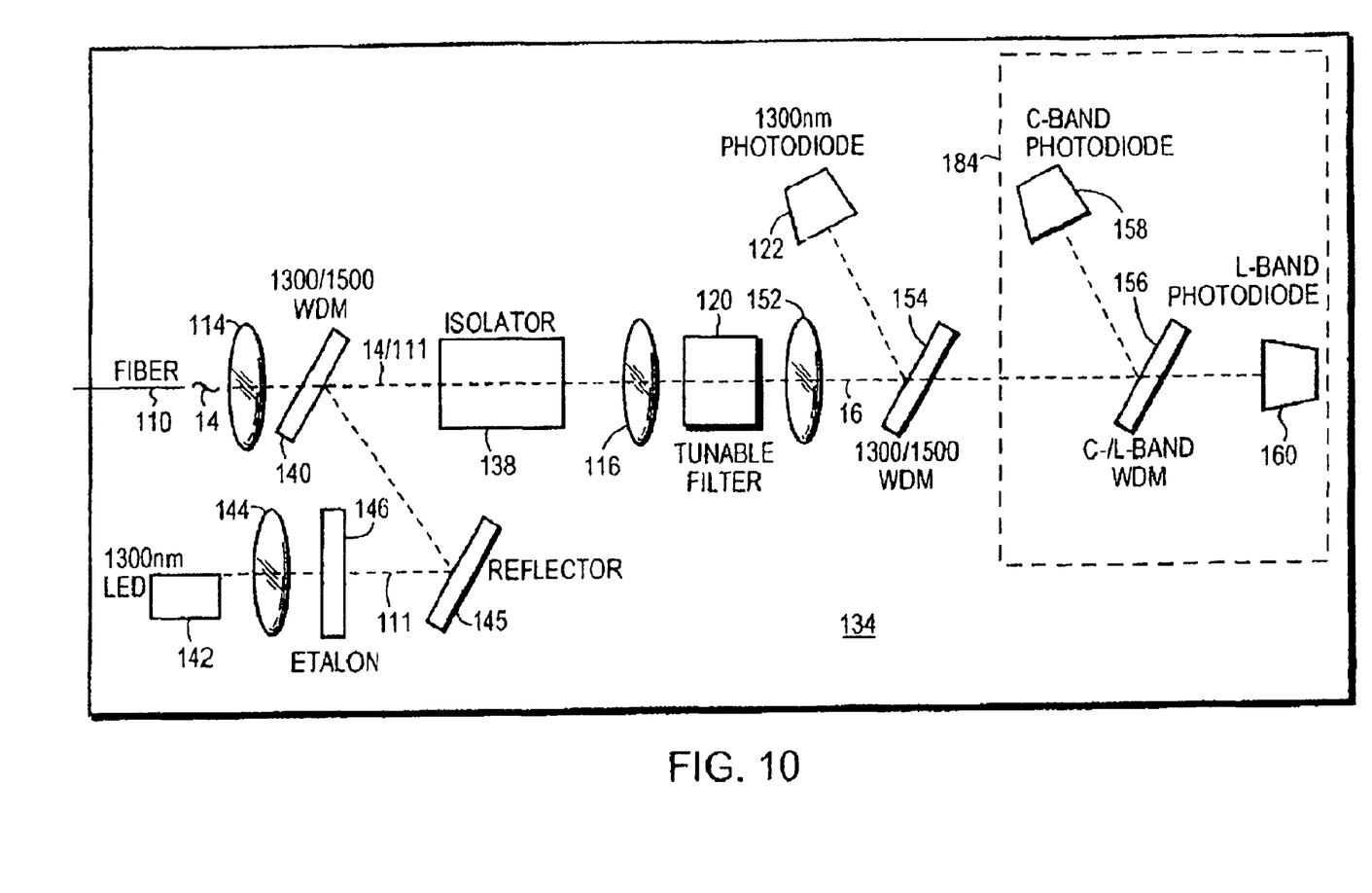
FIG. 10 is a perspective view of an optical channel monitor illustrating an optical system to which the inventive alignment technique is applied.

FIG. 10 shows the optical train of the optical channel monitoring system utilizing the optical filter train discussed with reference to FIGS. 1–9.

The fiber 110 terminates above an optical bench 135. During normal operation, the optical signal 14 is emitted out of the typically cleaved or cleaved-polished end-face of the fiber.

The optical signal is typically diverging as it is emitted from the fiber's core. It is collimated by the lens #1 114. Preferably, all lenses are formed utilizing mass-transport processes as described in U.S. Pat. No. 5,618,474, the teachings of which are incorporated herein by this reference in their entirety.

A dichroic mirror 140 is used to add a reference signal 111 to the optical signal 14. These dichroic mirrors or filters are typically referred to as WDM filters. In the illustrated implementation, the WDM filter 140 is reflective in a band surrounding 1300 nm, but transmissive in a band surrounding 1500 nm.

In the illustrated embodiment, the 1300 nm reference signal is generated by a light emitting diode 142. In one implementation, the light emitting diode is a super luminescent light emitting diode (SLED).

The diverging beam from the LED is collimated by a second collimating lens 144. An etalon 146 is used to convert the relatively wide-band signal from the SLED into a reference signal with stable spectral characteristics. More specifically, the etalon 146 functions as a Fabry-Perot filter with a 200 GigaHertz (GHz) free spectral range (FSR). This effectively converts the SLED's continuous, broadband spectrum into a signal with energy peaks every 200 GHz. These peaks are stable, particularly when the temperature of the system is controlled by a thermoelectric cooler or is otherwise stabilized.

A fold mirror 145 redirects the reference signal to the WDM filter 140. It should be noted, however, that this mirror is not required, but is simply used to facilitate integration of the system on a compact bench.

The combined optical signal 14/111 is transmitted through an isolator 138. This component is used to prevent back-reflections from the subsequent optical components into the fiber 132.

Lens #2 116 is used to focus the collimated combined beam 14/111 onto the tunable filter 120. After the tunable filter, the beam is recollimated by a third collimating lens 152, and transmitted to a second dichroic/WDM filter 154.

The second WDM filter 154 functions to separate the filtered reference signal from the filtered optical signal in the filtered beam 16 from the tunable filter 120. In the illustrated implementation, the second WDM filter 154 is reflective in a band around 1300 nm, but transmissive in a band around 1500 nm. As a result, the filtered reference signal is directed to the wavelength reference detector 122 for optical-electrical conversion.

The filtered optical signal is transmitted to the signal detector system 184. In the illustrated embodiment, the L- and C-bands are separated from each other by a third WDM filter 156. This WDM filter 156 is reflective to the C-band and transmissive to the L-band. As a result, the C-band of the WDM signal is detected by a C-band photodiode 158; the L-band is transmitted through the WDM filter 156 to be detected independently by an L-band photodiode 160. In other embodiments, more than two bands, such as three or four, are detected simultaneously by adding additional WDM filters and detectors.

This system provides for out-of-band calibration. This yields the advantage that the calibration can occur simultaneously with wavelength monitoring. Specifically, one or more of the filter's modes are used for signal detection while another mode is used to simultaneously filter the calibration signal.

In alternative embodiments, a similar stable source is used for in-band calibration. One downside to such embodiments, however, is the fact that complex post processing and/or time multiplexing functionality is required upstream of the detectors to switch between signal monitoring and signal calibration.

In alternative embodiments, other LED sources are used, such as LED sources operating at approximately 1400 nm, such as an InGaAsP SLED.

The salient features of the tunable filter 120 are its selectable free spectral range. In the preferred embodiment, the free spectral range is 20 nm<FSR<170 nm at 1550 nm wavelength. It preferably also has high finesse, i.e., greater than 3,000, and a compact size.

In the preferred embodiment, the filter is as described in patent application Ser. No. 09/649,168, by Flanders, et al., entitled Tunable Fabry-Perot Filter, filed on Aug. 25, 2000, this application is incorporated herein by this reference.

In the preferred embodiment, a 40 nm FSR is selected. This enables simultaneous scans of the C and L-bands, in addition to calibration relative to the reference band. Generally, to enable simultaneous scanning, the FSR of the filter must be greater than the bandwidth of at least one of the bands of interest so that successive modes of the filter can access both bands simultaneously. The FSR, however, must be less than the combined bandwidth of the bands, again to enable simultaneous access. Generally, the FSR is determined by the length 1 of the Fabry-Perot cavity in the filter, FSR=2l/c.

This three-way simultaneous scanning reduces the total scan time while providing for simultaneous calibration. In other embodiments, the free spectral range of the tunable filter is increased to 57.5 nm to enable monitoring of the optical service channels that flank the C-and L-bands.

In some implementations, a spatial mode aperture is used in conjunction with the tunable filter. Such intra-filter apertures are desirable when extra cavity mode control devices are not used. For example, in some other implementations, a length of single mode fiber follows the filter to attenuate higher order modes.

While this invention has been particularly shown and described with references to preferred embodiments thereof, it will be understood by those skilled in the art that various changes in form and details may be made therein without departing from the scope of the invention encompassed by the appended claims.

What is claimed is:

1. An alignment process for a fiber optic system including at least one lens and a tunable filter element, the process comprising:
    transmitting an optical signal into the system;
    detecting a back-reflection from the lens and/or the tunable filter element;
    manipulating a position of the lens relative to the tunable filter element in response to the back-reflection.

2. An alignment process as claimed in claim 1, wherein the step of transmitting the optical signal into the system comprises transmitting the optical signal via a fiber pigtail of the system.

3. An alignment process as claimed in claim 1, wherein the step of detecting the back-reflection comprises detecting an optical signal coupled into a fiber pigtail of the system from the system.

4. An alignment process as claimed in claim 1, further comprising inserting a mirror optically between a first lens and a second lens in the fiber optic system.

5. An alignment process as claimed in claim 4, further comprising transmitting an optical signal to the fiber optic system via a fiber pigtail while detecting back reflections from the mirror.

6. An alignment process as claimed in claim 5, further comprising moving the first lens relative to an endface of the fiber in response to backward coupling of the optical signal into the fiber from the mirror.

7. An alignment process as claimed in claim 6, further comprising translating a second lens in the optical train in response to a level of back reflections from the filter element with the mirror removed.

8. An alignment process as claimed in claim 1, further comprising:
    coating the filter to be reflective at a predetermined wavelength; and
    tuning the optical signal to the predetermined wavelength.

9. An alignment process as claimed in claim 1, further comprising:
    optically inserting a camera into an optical link of the optical system;
    generating an image of the lens, and
    translating the lens relative to the optical system in response to the image.

10. An alignment process as claimed in claim 9, further comprising:
    removing the imaging device from the optical path; and
    inserting the fiber pigtail into the optical system.

11. An alignment process as claimed in claim 10, further comprising:
    exciting the optical train with a signal via the optical fiber;
    detecting a ratio between two optical modes in a backreflection signal from the optical system.

12. An alignment system, for an optical system comprising a lens and a tunable filter element, the alignment system comprising:
    an optical signal source;
    an optical signal detector for detecting back-reflections from the optical system;
    a reflective element in the optical system that produces the back-reflections;
    a manipulation system for moving the lens and tunable filter element relative to each other in response to the back-reflections, and
    wherein the optical signal source that emits radiation at a frequency not coinciding with a resonant peak of the tunable filter element.

13. An alignment system, for an optical system comprising a lens and a tunable filter element the alignment system comprising:
    an optical signal source;
    an optical signal detector for detecting back-reflections from the optical system;
    a reflective element in the optical system that produces the back-reflections;
    a manipulation system for moving the lens and tunable filter element relative to each other in response to the back-reflections; and
    wherein the reflective element is insertable such that it is orthogonal to an axis of the optical system.

14. An alignment process for a fiber optic system including at least one lens and a tunable filter element, the process comprising:
    transmitting an optical signal into the system;
    optically inserting a camera into an optical link of the optical system;
    generating an image of the lens;
    translating the lens relative to optical system in response to the image;
    exciting the optical train with a signal via an optical fiber;
    detecting a ratio between two optical modes in a signal from the optical system; and
    aligning the system to minimize the ratio.

15. An alignment process for a fiber optic system including at least two lenses and a tunable filter element, the process comprising:
    transmitting an optical signal into the system;
    optically inserting a camera into an optical link of the optical system;
    generating an image of a first lens,
    translating optical elements of the fiber optic system in response to the image of the first lens;
    generating an image of a second lens, and translating optical elements of the fiber optic system in response to the image of the second lens.

16. An alignment process as claimed in claim 15, wherein the step of transmitting the optical signal into the system comprises transmitting the optical signal backwards through the optical system.

17. An alignment process as claimed in claim 15, wherein the optical signal is tuned to a passband of the tunable filter.

18. An alignment process as claimed in claim 15, further comprising:

removing the camera from the optical path; and inserting the fiber pigtail into the optical system.

19. An alignment process as claimed in claim 15, further comprising:

exciting the optical train with a signal via an optical fiber;

detecting a ratio between two optical modes in a signal from the optical system; and aligning the system to minimize the ratio.

20. An alignment process for a tunable filter optical train of a fiber optic system, the process comprising:

transmitting an optical signal into the optical train, which comprises an optical fiber, a tens, and a MEMS tunable filter that are attached to a bench;

detecting the optical signal after transmission through at least part of the optical train; and moving the lens, the MEMS tunable filter, and/or an endface of the optical fiber of the optical train in response to the detected optical signal to improve an alignment of the optical train;

detecting a ratio between two optical modes of the tunable filter.

21. An alignment process as claimed in claim 20, wherein the step of detecting the optical signal comprises detecting a back-reflection from the MEMS tunable filter.

22. An alignment process as claimed in claim 20, wherein the step of detecting the optical signal comprises detecting the optical signal after transmission through the tunable filter.

23. An alignment process as claimed in claim 20, wherein the step of transmitting the optical signal into the optical train comprises transmitting the optical signal via the optical fiber endface.

24. An alignment process as claimed in claim 20, further comprising inserting a mirror optically into the optical train.

25. An alignment process as claimed in claim 24, further comprising transmitting an optical signal into the optical train via the optical fiber endface while detecting back reflections from the mirror.

26. An alignment process as claimed in claim 20, further comprising translating a second lens in the optical train relative to the bench in response to the detected optical signal.

27. An alignment process as claimed in claim 20, further comprising:

coating the filter to be reflective at a predetermined wavelength; and tuning the optical signal to the predetermined wavelength.

28. An alignment process as claimed in claim 20, wherein the step of detecting the optical signal comprises detecting the optical signal after transmission through the tunable filter.

29. A fiber optic alignment system for an optical train comprising at least a lens and a tunable filter, the system comprising:

an optical signal source;

an optical signal detector for detecting the optical signal after transmission through at least part of the optical train; and a manipulation system for moving the lens and the tunable filter in response to the optical signal detector;

wherein the optical signal source that emits radiation at a frequency not coinciding with a resonant peak of the tunable filter element.

30. An alignment system as claimed in claim 29, further comprising a reflective element in an optical link that produces back-reflections that are detected by the optical signal detector.

31. An alignment system as claimed in claim 30, wherein the reflective element is insertable such that it is orthogonal to an axis of an optical path of the optical system.

32. An alignment system as claimed in claim 29, wherein the optical signal detector comprises a camera for detecting the optical signal.

33. An alignment system as claimed in claim 29, wherein a camera generates an image of the lens.

34. An alignment system as claimed in claim 29, wherein the optical signal source generates an optical signal that covers a passband of the tunable filter.

35. An alignment system as claimed in claim 29, wherein the manipulation system moves a second lens of the optical train relative to the lens and the tunable filter in response to the detected optical signal.

36. An alignment system as claimed in claim 29, wherein the optical signal source transmits the optical signal backwards though the optical train.

37. An alignment system as claimed in claim 29, wherein the optical signal is transmitted though an endface of the fiber between the optical signal source and the optical signal detector.

38. An alignment system as claimed in claim 29, wherein the manipulation system moves the lens and tunable filter relative to each other in response to a spectral response of the tunable filter.

* * * * *

UNITED STATES PATENT AND TRADEMARK OFFICE
CERTIFICATE OF CORRECTION

PATENT NO. : 6,813,420 B1
DATED : November 2, 2004
INVENTOR(S) : Jeffrey A. Korn It is certified that error appears in the above-identified patent and that said Letters Patent is hereby corrected as shown below:

Column 8,
Line 30, after "filter element" insert -- , --.

Column 9,
Line 23, delete "tens" and insert -- lens --.

Signed and Sealed this

First Day of February, 2005

JON W. DUDAS
*Director of the United States Patent and Trademark Office*